(12) United States Patent
Krantz

(10) Patent No.: US 7,833,302 B2
(45) Date of Patent: Nov. 16, 2010

(54) SYSTEM AND METHOD FOR REMOVING POLLUTANTS FROM A ROADWAY

(75) Inventor: Jeffrey Krantz, Honolulu, HI (US)

(73) Assignee: 3K Technologies, Inc., Honolulu, HI (US)

( * ) Notice: Subject to any disclaimer, the term of this patent is extended or adjusted under 35 U.S.C. 154(b) by 204 days.

(21) Appl. No.: 12/167,197

(22) Filed: Jul. 2, 2008

(65) Prior Publication Data

US 2009/0000257 A1 Jan. 1, 2009

Related U.S. Application Data

(60) Division of application No. 10/936,873, filed on Sep. 9, 2004, now abandoned, which is a continuation-in-part of application No. 10/797,985, filed on Mar. 9, 2004, now Pat. No. 7,094,268, and a continuation-in-part of application No. PCT/US2004/007368, filed on Mar. 9, 2004.

(60) Provisional application No. 60/517,153, filed on Nov. 3, 2003, provisional application No. 60/454,863, filed on Mar. 12, 2003.

(51) Int. Cl.
*B01D 50/00* (2006.01)
(52) U.S. Cl. .................. 55/385.3; 188/218 A
(58) Field of Classification Search ............... 55/385.1, 55/385.3; 95/28, 57; 188/218 A, 218 XL; 123/198 E
See application file for complete search history.

(56) References Cited

U.S. PATENT DOCUMENTS

| 1,864,969 A | 9/1925 | White |
| 1,662,738 A | 3/1928 | Coogle |
| 1,931,946 A | 8/1931 | Zerk |
| 2,003,109 A | 5/1932 | Farr |
| 2,071,280 A | 5/1934 | Eksergian |

(Continued)

FOREIGN PATENT DOCUMENTS

DE 197 15 435 A1 10/1998

(Continued)

OTHER PUBLICATIONS

Green, "The Causal Factor of Bus Wheel Injuries and a Remedial Method for Prevention of These Accidents," *J. Natl. Acad. of Forensic Engineers*, vol. XVIII, No. 1, Jun. 2001 (9 pgs).

(Continued)

*Primary Examiner*—Duane Smith
*Assistant Examiner*—Minh-Chau Pham
(74) *Attorney, Agent, or Firm*—Luce, Forward, Hamilton & Scripps, LLP; Mark Krietzman

(57) ABSTRACT

Systems and methods for capturing pollutants from braking mechanisms are provided. The systems can include a pollution trap attached to a brake assembly, where the pollution trap can comprise an absorbent pad, filter, or membrane. The pollution trap can be positioned near a braking mechanism, for example, between a portion of the braking mechanism and a portion of a wheel, to collect pollutants including brake dust. The pollution trap can also be positioned on the wheel in various embodiments. The material used in the pollution trap can also be used to form gloves, cloths, sponges or wipes for cleaning brake dust.

11 Claims, 13 Drawing Sheets

U.S. PATENT DOCUMENTS

| | | | |
|---|---|---|---|
| 2,590,363 A | 3/1952 | Adair | |
| 2,945,723 A | 7/1960 | Estes | |
| 2,952,339 A | 9/1960 | Felts | |
| 2,988,173 A | 6/1961 | Romine | |
| 3,738,088 A | 6/1973 | Colosimo | |
| 4,005,768 A | 2/1977 | Bubnash | |
| 4,093,038 A * | 6/1978 | Molin | 180/271 |
| 4,207,971 A | 6/1980 | Ishikawa et al. | |
| 4,290,820 A | 9/1981 | Swisher, Jr. et al. | |
| 4,323,377 A | 4/1982 | Jolin | |
| 4,484,667 A | 11/1984 | Bottieri, Jr. | |
| 4,921,276 A | 5/1990 | Morin | |
| 5,035,304 A | 7/1991 | Bosch | |
| 5,039,414 A | 8/1991 | Mueller et al. | |
| 5,147,429 A | 9/1992 | Bartholomew et al. | |
| 5,162,053 A * | 11/1992 | Kowalski, Jr. | 55/385.3 |
| 5,257,822 A | 11/1993 | Metcalf | |
| 5,358,442 A | 10/1994 | Ekinci | |
| 5,437,793 A | 8/1995 | Alper | |
| 5,509,690 A | 4/1996 | Whittington | |
| 5,509,853 A | 4/1996 | Wells | |
| 5,549,178 A | 8/1996 | Yuhas | |
| 5,614,100 A | 3/1997 | Gallup | |
| 5,692,547 A | 12/1997 | Lehr | |
| 5,698,139 A | 12/1997 | Alper | |
| 5,711,402 A | 1/1998 | Sumpter, Sr. | |
| 5,772,286 A | 6/1998 | Jordan | |
| 5,837,146 A | 11/1998 | Alper | |
| 5,961,823 A | 10/1999 | Alper | |
| 5,967,200 A | 10/1999 | Hall | |
| 5,993,372 A | 11/1999 | Holland | |
| 6,117,213 A * | 9/2000 | Ueda et al. | 95/273 |
| 6,170,586 B1 | 1/2001 | Stroman | |
| 6,180,010 B1 | 1/2001 | Alper | |
| 6,212,882 B1 * | 4/2001 | Greger et al. | 60/274 |
| 6,475,393 B2 | 11/2002 | Alper | |
| 6,524,457 B1 | 2/2003 | Scott | |
| 6,524,842 B1 | 2/2003 | Vainberg et al. | |
| 6,524,992 B2 | 2/2003 | Mussmann et al. | |
| 6,526,741 B2 | 3/2003 | Whitehead et al. | |
| 6,565,620 B1 * | 5/2003 | Greeson | 55/385.3 |
| 6,592,642 B2 | 7/2003 | Maricq et al. | |
| 6,743,281 B1 | 6/2004 | Miller | |
| 7,094,268 B2 * | 8/2006 | Krantz | 55/385.3 |
| 7,497,894 B2 * | 3/2009 | Jeffers et al. | 95/45 |
| 2002/0014259 A1 | 2/2002 | Hahnl | |
| 2004/0079229 A1 * | 4/2004 | Daly | 95/268 |
| 2004/0231519 A1 * | 11/2004 | Hoffman | 96/222 |
| 2005/0034946 A1 | 2/2005 | Krantz | |
| 2006/0107636 A1 * | 5/2006 | Gage | 55/385.3 |
| 2006/0230729 A1 * | 10/2006 | Tabrizi et al. | 55/385.3 |
| 2007/0056254 A1 * | 3/2007 | Relyea | 55/385.3 |

FOREIGN PATENT DOCUMENTS

| | | |
|---|---|---|
| EP | 0 707 989 A1 | 4/1996 |
| GB | 2 218 354 A | 11/1989 |
| JP | 1 099634 A | 4/1989 |
| JP | 4 297341 A | 10/1992 |

OTHER PUBLICATIONS

Squillance, et al., "Preliminary assessment of the occurrence and possible sources of MTBE in groundwater in the United States, 1993-1994," *Environ. Sci. Technol.*, 30:1721-1730 (1996) (10 pgs).

http://www.kleenwheels.com/kleenwheels_install.htm Easy to Follow Instructions. Jul. 9, 2004 (2 pgs).

http://www.kleenwheels.com/kleenwheels_faq.htm How Can I Find a Dealer or Reach Someone for Technical Information? Jul. 9, 2004 (3 pgs).

http://www.kleenwheels.com Kleen Wheels are dust shields which protect your wheels from brake dust Jul. 9, 2004 (1 pg).

* cited by examiner

SYSTEM AND METHOD FOR REMOVING POLLUTANTS FROM A ROADWAY

RELATED APPLICATION

This application is a divisional of U.S. application Ser. No. 10/936,873 filed Sep. 9, 2004 now abandoned, which is a continuation-in-part of U.S. application Ser. No. 10/797,985 filed Mar. 9, 2004, now issued U.S. Pat. No. 7,094,268 B2, which claims the benefit of U.S. Provisional Application No. 60/517,153 filed Nov. 3, 2003, and U.S. Provisional Application No. 60/454,863 filed Mar. 12, 2003, all of which are hereby expressly incorporated by reference in their entireties. application Ser. No. 10/936,873 filed Sep. 9, 2004 is also a continuation-in-part of and claims priority to International Application No. PCT/US2004/007368, filed Mar. 9, 2004, which designates the United States and was published in English, entitled "System And Method for Removing Pollutants From a Roadway".

BACKGROUND

1. Field

The present disclosure relates to devices that remove pollutants from roadway surfaces. More specifically, the embodiments described herein include pollutant traps, such as porous filters, pads, or membranes, that attach to the under carriage of moving vehicles and collect roadway pollutants that are liberated from the road surface. Methods of using these devices to remove pollutants from the environment are also provided.

2. General Background

According to the Environmental Protection Agency (EPA), nonpoint source pollution (NPS) is now the leading cause of water quality problems in America. NPS is caused by rainfall or snowmelt moving over and through the ground. As the runoff moves, it picks up and carries away natural and human-made pollutants, finally depositing them into coastal waters, lakes, rivers, wetlands and even our underground sources of drinking water. (See, for example, "Oil in the Sea" in Pollution Equipment News, dated October 2002.) These pollutants are many and varied, but they include oil, grease and toxic chemicals from urban runoff and energy production. Atmospheric deposition and hydromodification are also prime sources of NPS.

The accumulation of hydrocarbons and toxic metals on roadway surfaces is largely attributable to tailpipe emissions, tire tread wear, leaking automotive fluids, brake pad deterioration, and dirty car-washing water. (See U.S. Pat. No. 5,993,372, the entirety of which is hereby expressly incorporated by reference.) As tailpipe exhaust is emitted, for example, the many "fine" particles in the exhaust are either inhaled or they are filtered back down back down on to the street, waiting for rain to wash them into a storm sewer or for rolling tires to throw them back into the air (also referred to as "re-entrainment.") Fine particles, carbon monoxide, nitrogen oxides, volatile organic compounds, toxic organic compounds (e.g., toluene), and other heavy metals are all found in tail pipe exhaust. Additionally, as tire tread wears, pollution accumulates on roadway surfaces in the form of zinc, cadmium, carbon black, and fine particles of rubber. Furthermore, leaking oil, antifreeze, brake and transmission fluids, battery acid, grease and degreasing agents, also accumulate on the roadway surfaces. These automotive liquids contain toxic organic compounds and metals, as well. Brake pad dust is also a major source of roadway pollution and significantly contributes to the accumulation of copper in our waterways. In the San Francisco Bay, for example, brake pad dust is reported to be the largest source of copper pollution. (See "How Do Vehicles Pollute the Bay? Let's Count the Ways" available at the Palo Alto (Calif.) Regional Water Quality Control Plant web site.)

The accumulation of roadway pollution is having a drastic effect on human health. In a study financed largely by the National Institute of Environmental Health Sciences, researchers calculated that the number of deaths from lung cancer increases by eight percent for every ten micrograms of fine particulate matter per cubic meter. The risk of dying from lung cancer as well as heart disease in the most polluted cities has been compared to the risk associated with nonsmokers being exposed to second-hand (cigarette) smoke over a long period of time. (See Jeanie Davis, "Air Pollution Increases Lung Cancer Risk; Evidence Links Bad Air with Heart Disease, Too" MSN and WebMD Medical News, Mar. 5, 2002.") Since the number of automobiles is increasing three times faster than the rate of population growth in the world and approximately 40% of deaths around the world can be attributed to various environmental factors, especially organic and chemical pollutants, the need for a device and method to remove these toxins from roadway surfaces is manifest. (See BioScience, October 1998 issue.)

Several different devices have been made to trap pollutants that are emitted from automobiles (e.g., U.S. Pat. Nos. 6,170,586, 5,711,402, 5,993,372, 5,967,200, 5,549,178, 5,692,547, and 6,524,992, all of which are hereby expressly incorporated by reference in their entireties). Although these devices and approaches reduce pollution by trapping the pollutants before they contact the roadway surfaces, there remains a significant need for devices and methods that remove pollutants that have already accumulated on roadway surfaces.

SUMMARY

The disclosure includes embodiments of systems and methods for removing pollutants from a roadway surface. In one embodiment, the system includes a vehicle that comprises a pollutant trap that is mounted on the underside of the vehicle such that an exposed surface of the pollutant trap collects pollutants that are distributed onto the trap when a vehicle is driven over the roadway (e.g., pollutants liberated from the roadway surface by the tires of the vehicle or by the suction created under the vehicle during driving or when suction is induced by a fan, blower, or vacuum). In some embodiments, the pollutant trap comprises a frame and/or a pad. In one embodiment, the pollutant trap comprises an ionic cleaning system that adds charged ions to the air and traps pollutant particles with electrostatically-charged collection plates. In other embodiments, the pollutant trap comprises a pad or filter that is affixed to the vehicle. In yet other embodiments, the system includes a fan, blower or vacuum that induces or focuses air and pollutants to the pollutant trap.

The pollutant trap can be mounted on the interior of the wheel well of the vehicle at a position that collects the spray that is emitted from the tires of the vehicle as the vehicle travels over the roadway or at a position that allows for the pollutants that are sucked under the vehicle to contact the pollutant trap. In other embodiments, the pollutant trap is mounted on the mud flaps of the vehicle. The pollutant trap can be attached by several types of fasteners including, but not limited to, screws, glue, nails, clamps, hook and loop fasteners (e.g., VELCRO® brand hook and loop fasteners), and/or sleeves that hold the pollutant trap in place. In other embodiments, the wheel housing on the vehicle is modified or redesigned such that it is or incorporates the pollution trap. In another embodiment, the wheel housing is optimized to focus the pollutants, which are sucked under the vehicle or into the wheel housing, to the pollutant trap. In various embodiments, the pollutant trap can be an oleophilic pad, a hydrophobic pad, a hydrophobic and hydrophilic pad, a charged pad, an uncharged pad, a magnetic pad, or a pad that traps hydrocarbons or toxic metals, and combinations thereof. For example, the pollutant trap can comprise a positively charged plastic material that can attract negatively charged biological matter.

Other embodiments of the disclosure concern methods to remove pollutants from roadway surfaces. For example, in one embodiment, pollutants that are present on a roadway surface are dispersed under the vehicle (e.g., liberated by the tires, sucked under the vehicle by the vacuum created while driving, or by airflow created by a fan, blower, or vacuum) and are captured by a pollutant trap that is mounted on the undercarriage of a vehicle. Some embodiments include trapping the pollutants from the roadway surface in a pollution trap which is mounted inside the wheel well of a vehicle. Other embodiments include trapping the pollutants from the roadway surface in a pollutant trap mounted on the mud flaps of the vehicle. Another embodiment includes removing pollutants from a wet or dry roadway surface by liberating or disturbing the pollutants with a vehicle and collecting or trapping the pollutants in an exposed portion of a pollution trap mounted on the underside of the vehicle. Using the systems and methods of the disclosure described herein, roadway pollutants (e.g., hydrocarbons, volatile chemicals, and toxic metals) are removed from the environment.

Other embodiments of the disclosure include systems and for capturing a pollutant, comprising a brake assembly comprising a movable braking surface, a brake pad positioned near the movable braking surface, the brake assembly configured to place the brake pad in contact with the braking surface, and a pollution trap positioned near the brake assembly such that the pollutant trap is exposed to pollutants generated from contacting the brake pad and the brake surface. The pollution trap can comprise a pollutant trap pad that binds a pollutant contacting said pad so that the pollutant is captured by the pollution trap. The system can further comprise a pollutant deflector positioned between a wheel connected to the braking surface and the braking surface, where the pollution trap is disposed on the side of the deflector shield facing the braking surface.

Another embodiment of the disclosure includes a system for capturing a pollutant generated by placing a brake pad in contact with a moving braking surface, comprising a pollution trap comprising a material for binding a pollutant so as to capture the pollutant in the pollution trap, the pollution trap being positioned relative to a brake pad and a braking surface such that the material is exposed to the pollutant generated when the brake pad contacts the braking surface when the braking surface is moving. The system can further comprise an automobile, wherein the pollution trap, the brake pad and the braking surface are disposed on the automobile. In some embodiments, the system comprises a brake assembly comprising the brake pad and the braking surface, and wherein the pollution trap is connected to the brake assembly. In some embodiments, the pollution device is positioned between an inner portion of a wheel rim and at least a portion of the braking surface, the wheel rim having the inner portion facing towards the braking surface and an outer portion facing away from the braking surface, the wheel rim being connected to the braking surface such that slowing the movement of the braking surface also slows the movement of the wheel rim. In some embodiments, the pollution trap is connected to the wheel rim. In another embodiment, the system further comprises a magnet positioned in a location relative to a point where the brake pad contacts the braking surface during braking such that said magnet is exposed to a pollutant resulting from contacting the braking surface with the brake pad.

In another embodiment, a method for capturing a pollutant generated by the contact of a brake pad with a moving surface used for braking comprises positioning a pollution trap between a wheel of a vehicle and at least a portion of a moving surface connected to the wheel and used for braking, exposing a pollutant trap pad held by the pollution trap to a pollutant generated by contacting a brake pad with the moving surface used for braking, and capturing the pollutant on the pollution trap pad.

In another embodiment a device for collecting brake dust off of brake parts or wheels, comprises a wiper material comprising a pollution trap material. The wiper material can be configured in the shape of a glove configured to fit over at least a portion of a hand, and the wiper material can be oleophilic.

DETAILED DESCRIPTION

Figure 1:
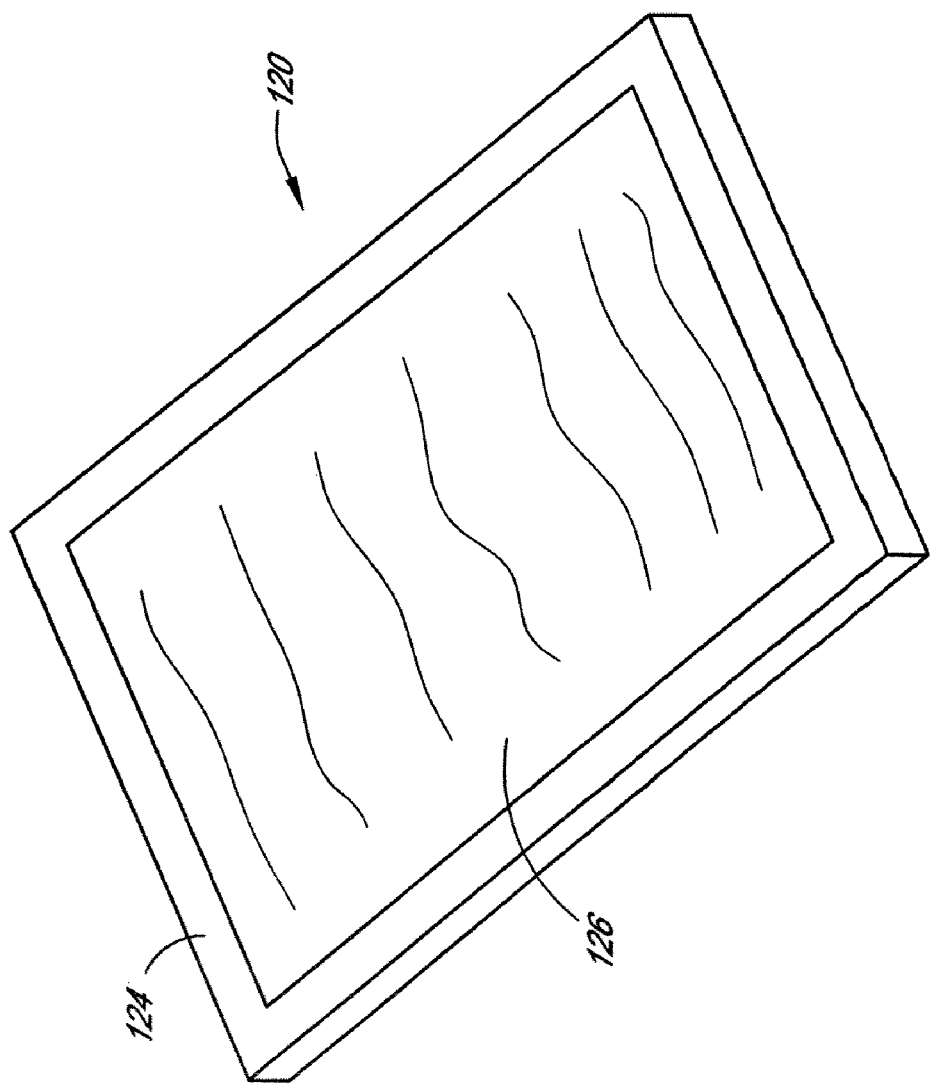
FIG. 1 is a perspective view of a pollutant trap in accordance with the preferred embodiments of the present disclosure.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

Devices and methods for trapping pollutants that accumulate on roadway surfaces have been developed and are described herein with reference to the accompanying figures. In several embodiments, the device comprises a pollutant trap that is affixed to the undercarriage of a vehicle at a position that allows the trap to collect and/or bind roadway pollutants as they are liberated from the roadway surface (e.g., pollutants that are liberated by the tires of the vehicle while driving, pollutants sucked under the vehicle by the vacuum created while driving, or pollutants forced under the vehicle or focused on to a filter by the airflow created by a fan, blower, or vacuum). Forced induction or suction of air using, for example, blowers, motors, or fans, can be used to increase the air flow and the flow of roadway pollutants to the pollutant trap. For example, forced induction or suction of air can be used to increase the flow of roadway pollutants to the pollutant trap when the vehicle is not moving fast enough to create a sufficient air flow to the pollutant trap. Embodiments of the disclosure include a pollutant trap (e.g., a pad, filter or membrane) that is affixed to the wheel wells, splash guards, or mud flaps of a vehicle at a position that collects roadway spray (e.g., rainwater or roadway dust) generated by the wheels of the vehicle or at a position that allows for contact with roadway pollutants that are sucked under the vehicle by the vacuum created while driving or by forced air induction (e.g., fan, blower, or vacuum). The pollutant trap can be composed of many different materials and is, preferably, composed of a material that binds hydrocarbons, toxic metals, oils, tars, fuels, lubricants, organic chemicals, pesticides, bacteria, asbestos, salt from de-icing and the like.

A vehicle equipped with a pollutant trap (e.g., a hydrocarbon filter affixed to the roadway splash zone of the wheel wells) can be used to reduce the amount of hydrocarbons on a roadway surface by simply driving the vehicle over the roadway surface. As the tires liberate roadway pollutants, for example, by pulling a slurry of pollutants and water from a wetted roadway surface or creating an aerosol of pollutant-laden dust from a dry roadway surface, the pollutants are brought into contact with the pollutant trap and affixed thereto, thereby reducing the amount of pollutants on the roadway surface.

Additionally, as a vehicle drives over a roadway surface, a vacuum is created under the vehicle, in particular at positions on the wheel well. The vehicle induced vacuum can be so considerable that it is thought to be the cause of several accidents whereby bicyclists are drawn into the wheels of passing busses (See J. Natl. Acad. of Forensic Engineers, vol. XVIII, No. 1, June 2001). As velocity increases, the pressure near the wheels of the vehicle decreases creating the vacuum. One embodiment of this disclosure utilizes this vacuum such that roadway pollutants that are liberated from the road surface are sucked under the vehicle and are disposed onto pollutant traps that are positioned under the vehicle and/or in the wheel wells of the vehicle, thereby reducing the amount of pollutants on the roadway surface.

A vehicle equipped with a pollutant trap (e.g., a hydrocarbon filter affixed to the wheel wells) and a pollutant liberator (e.g., a fan, blower, a vacuum that is affixed to the vehicle in a manner that generates airflow, preferable a vacuum, so as to bring pollutants in contact with the filter pad) is provided. The combination of the pollutant trap and pollutant liberator can improve the amount of pollutant collected onto the pollutant trap, especially when the vehicle is maintained at low rates of speed.

FIG. 1 shows a pollutant trap 120 in accordance with a one embodiment. The pollutant trap 120 not only prevents damage to the vehicle but, more importantly, removes pollutants from the roadway surface, by collecting the environmental pollutants as they are disturbed from the roadway surface. In some embodiments, the pollutant trap 120 separates the environmental pollutants from water, or other non-polluting roadway fluids. In some embodiments, the pollutant trap 120 may also solidify the pollutants.

In the embodiment shown in FIG. 1, the pollutant trap 120 includes a housing 124 and a pollutant trap pad 126. The housing 124 can be any type of structure that holds the pollutant trap pad, for example, a frame that "holds" the pollutant trap pad 126 and exposes both sides of the pad 126 for collecting pollutants. In another example embodiment, the housing can be a structure that holds the pollutant trap pad 126 and exposes one side pad 126 for collecting pollutants. In certain embodiments, the pad 126 can be arranged such that at least one surface is exposed to the roadway, wheel, or wheel well. In another embodiment, the pollutant trap 120 comprises a pollutant trap pad 126, without a housing 124. When referring herein to a structure or a frame that "holds" the pollutant trap pad 126, numerous types of embodiments are contemplated including where the pollutant trap pad is attached, in any way (e.g., via clips, snaps, hook and loop fasteners, buttons, adhesive, screws, fasteners with interlocking male and female parts, mechanical pressure, etc.) to the structure, the attachment being either permanently or removably.

As will be described in detail hereinafter in FIG. 4, the pollutant trap 120 can be attached to any part of a vehicle that exposes the pollutant trap pad 126 to roadway pollutants, including the underside of a vehicle, or the wheel housing. The wheel housing (or wheel well) of a vehicle can be designed such that it improves the vacuum under the vehicle or into the wheel well and focuses the dispersed pollutants onto the pollutant trap pad 126.

Figure 2:
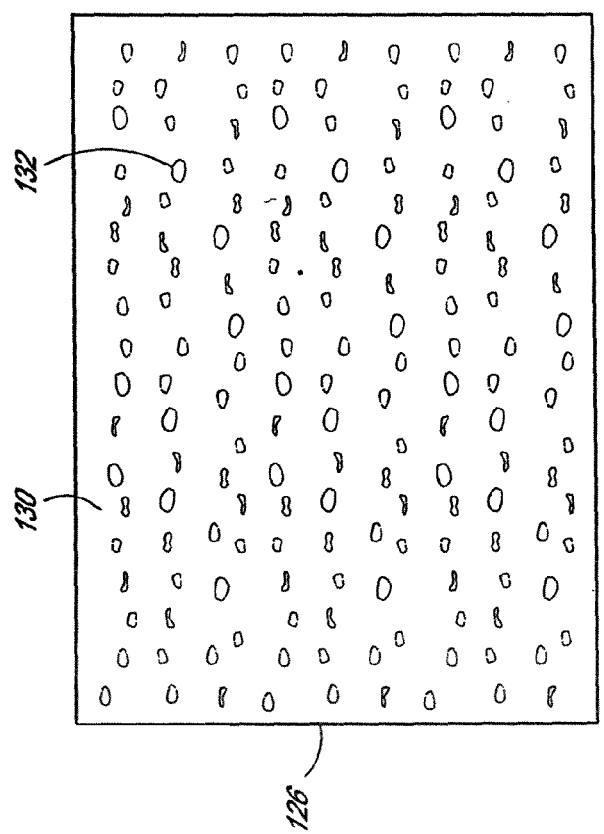
FIG. 2 is a front view of a pollutant trap.

As shown in a top or bottom broad surface view in FIG. 2, the pollutant trap pad 126 can comprise a pollutant trap material 130 which may comprise, for example, a membrane, sponge or a filter, that collects hydrocarbons and/or toxic metals. In some embodiments, the pollutant trap material 130 can bind, collect, catch and/or retain pollutants. In some embodiments, the pollutant trap pad 126 can comprise material that can repel water or other non-polluting roadway fluids. In one embodiment, the pollutant trap material 130 comprises a quilted absorbent pad for placement on the vehicle. In another embodiment, pollutant trap material 130 comprises a plurality of pores 132 that help the pollutant trap material 130 bind, collect, catch and/or retain pollutants.

In one embodiment, the pollutant trap material 130 comprises an absorbent sponge, which can be from an animal or synthetic source. Sponges that can be used in certain embodiments of the disclosure include the pollutant trap 120 described in U.S. Pat. No. 5,039,414, the entirety of which is herein incorporated by reference. In some embodiments, the pollutant trap pad 126 comprises organisms or chemicals that degrade and/or convert the pollutant into a non-polluting material (e.g., oil degrading bacteria, spore or bactericidal compounds).

Figure 3:
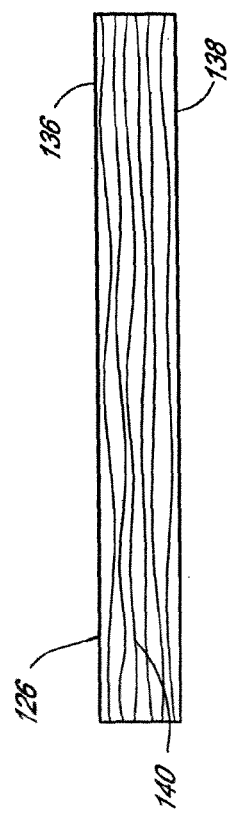
FIG. 3 is a side view of a pollutant trap.

FIG. 3 shows an edge view of a pollutant trap 126. The pollutant trap pad 126 has a top portion 136 and a bottom portion 138. The pollutant trap pad 126 can also include a plurality of layers 140. In some embodiments, all of the layers can have the same properties. In other embodiments, each of the layers 140 of the pollutant trap pad 126 can have different properties. For example, it may be desirable for the layers 140 at of near the top portion 136 to have hydrophobic properties (water-repellant), and/or layers 140 at or near the bottom portion 138 to have oleophilic properties (oil-attracting). In some embodiments, the pollutant trap pad 126 may include a coating, for example, a coating comprising a chemical or an organism, which provides the pollutant trap pad 126 with additional desirable properties.

In some embodiments, the pollutant trap pad 126 may be oleophilic, hydrophobic, or both oleophilic and hydrophobic. The pollutant trap pad 126 can comprise of materials that use absorption, adsorption, encapsulation, microencapsulation, volatilization, sedimentation, re-suspension, de-sorption, oxidation/reduction, complexation/chelation, precipitation, or biological uptake, or combinations thereof to remove the pollutants from the roadway.

In some embodiments the pollution trap pad 126 comprises sorbent material (referred to herein as "sorbents") that may be absorbent, adsorbent, or both. Absorbent materials are those that pick up and retain liquid distributed throughout its molecular structure. Adsorbent materials are insoluble materials that are coated by a liquid on its surface, including pores and capillaries. Sorbents can be natural organic, natural inorganic, or synthetic. Natural organic sorbents may include peat moss, straw, hay sawdust, ground corncobs, feathers, paper and other carbon-based materials. One example of a natural product that may be used is treated peat, available under the trade name "OCLANSORB", manufactured by Hi Point Industries, Newfoundland, Canada. Natural inorganic sorbents may include clay, perlite, vermiculite, glass wool, sand, volcanic ash, and the like. Synthetic sorbents may include plastics, such as polyurethane, polyethylene, and polypropylene, cross-linked polymers, rubber materials, gels, colloids, and the like. Preferably, combinations of absorbent materials are employed, which can be intermixed or provided in separate layers.

Many different types of absorbent material are known in the art, any of which can be incorporated into an embodiment of the pollutant trap 120 described herein. For example, some embodiments of the pollutant trap 120 include materials designed to collect salts that accumulate on roadways as a result of salting the roadways during the winter months. A suitable absorbent material for a pollutant trap pad 126 that collects roadway salt is described in U.S. Pat. No. 6,526,741, herein expressly incorporated by reference in its entirety. Alkali metals such as sodium and potassium salts can be readily absorbed to the absorbent material found in the Aqua Sep™ filter available from the Pall Process Filtration Company, Hydrocarbon, Chemical, Polymer Group. Use of this absorbent material in the pollution trap 120 described herein is contemplated. Similarly, the use of a magnetized absorbent material is known in the art and this technology can also be readily employed in the embodiments describe herein. (See e.g., U.S. Pat. No. 6,524,457, herein expressly incorporated by reference in its entirety).

Embodiments of the pollutant trap 120 can include many additional types of suitable membranes or filters that can be used alone or in combination with other membranes and filters described herein. For example, in various embodiments, the pollutant trap 120 can include one or more of the filtering materials produced by ESFIL TECHNO (a company located in company is located in North-East Estonia, within the territory of a free economic zone in an industrial part of Sillamae city), and the choice of filtering material can depend on the roadway pollutant(s) targeted for removal. In some example embodiments, the pollutant trap 120 can include a filtering polymer material ("FPM"), which is available from ESFIL TECHNO, and which is chemically stable to diluted acids, alkalis, alcohols, saturated hydrocarbon, glycerin, oils, petroleum and fresh water, and have a temperature range of maintenance from −30° C. up to +70° C. In other embodiments, the pollutant trap 120 can include a perchlorovinyl filtering material ("FPP"), which is available from ESFIL TECHNO, and which is chemically stable to strong acids and alkalis, alcohols, and saturated hydrocarbon, and has a working temperature range from −200° to 60° C. Examples of filtering materials that can be used in the pollutant trap 120 from ESFIL TECHNO includes, but is not limited to, FPP-D (generally used for thin air and gas filtering), FPP-D-4 (generally used for thin purification of liquids, fuels, oils including aviation oil, particles, air and gasses), FPP-G (generally used for purification of alcohols, acids and alkalis), POROFIL-G-5/206 (generally used for deleting of particles of more than five microns, and POROFIL-G-1/207 (intended for purification of perfumery liquids, alcohols, saturated hydrocarbons, oils, acids, technical and de-ionized water and aqueous solutions from mechanical impurities), FPAR-15-1.5 (generally used for filtering thin gases and air), and FPSF-15-1.5 (generally used for thin clearing of air from aero disperse mixtures, including microorganisms, bacteria and viruses).

Although the pollutant trap 120 can comprise various materials that can be used as filters in other applications, or referred to herein as "filters" or "filter material," the use of these such materials does not necessarily require an air-flow passing through the material when it is used in a pollutant trap, although in some cases the air-flow can pass through the material. Rather, an air-flow carrying roadway pollutants need only place the pollutants in proximity to the filter material so that the roadway pollutants are collected on, in or are bound to the filter material. In some embodiments, the pollutant trap 120 may comprise materials that have a high tolerance for heat, e.g., materials that have pollutant collection properties that are not affected by high temperatures, and/or materials that have a high combustion point, allowing the pollutant trap 120 to be disposed in locations on a vehicle subject to high temperatures, e.g., in proximity to the engine or the exhaust system.

Another common roadway pollutant that causes significant environmental damage are ether-based contaminants such as tertiary butyl ethers of the type utilized as gasoline oxygenates, for example, methyl tert-butyl ether (MTBE), ethyl tert-butyl ether, and methyl tert-amyl ether, and also ether solvents, for example, tetrahydrofuran. The full extent of MTBE contamination in US groundwaters has only recently been understood. A study performed as part of the US Geological Survey's National Water-Quality Assessment Program revealed that MTBE is the second most commonly detected contaminant in urban groundwaters (Squillace P. J., J. S. Zogorski, W. G. Wilber, and C. V. Price. "Preliminary assessment of the occurrence and possible sources of MTBE in groundwater in the United States, 1993-1994". Environ. Sci. Technol. 30:1721-1730 (1996)). Several different absorbent materials are known to trap the ether-based contaminants, in particular, MTBE, as well as, oils and greases. (See e.g., U.S. Pat. Nos. 5,437,793, 5,698,139, 5,837,146, 5,961,823, 6,524, 842, 6,180,010, 6,475,393, and 5,614,100, all of which are hereby expressly incorporated by reference in their entireties).

With many of the embodiments, a suitable absorbent material, such as the absorbent material described in U.S. Pat. No. 6,475,393, or a similar material, may be preferred for the pollutant absorbent pad 126 because it efficiently collects oils, greases and the like, but also traps pernicious slightly soluble organic compounds such as benzene, toluene, xylene, halogenated hydrocarbons, ethoxylated glycols, etc. These noxious contaminants are among the more difficult compounds to remove from water and are carcinogenic. This absorbent material can also remove metal ions such as cadmium, chromium, copper, lead, nickel, zinc, arsenic, silver, and mercury. Example 1 below describes one way to manufacture this absorbent material.

EXAMPLE 1 in order to prepare a filter substrate for use with the disclosure, an infusion solution is prepared from a suitable solvent and the absorbent composition. In this example a solution is prepared from 90 w/w 99.9% acetone and 10 w/w absorbent composition, which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example is a nonwoven polypropylene, viz. the VERASPUN material of Yarorough & Co., Inc. of High Point N.C. This material has a weight of 1 oz./square ft. The substrate material is immersed in the infusion solution until saturated, then removed and excess liquid allowed to drip off. The material is then placed in a convection oven at 110 to 120° F. until acetone free. The material is then cured at room temperature for one week. The resulting material is then shredded and subsequently formed in various filter configurations (e.g., to fit in the wheel well of a vehicle).

Figure 4:
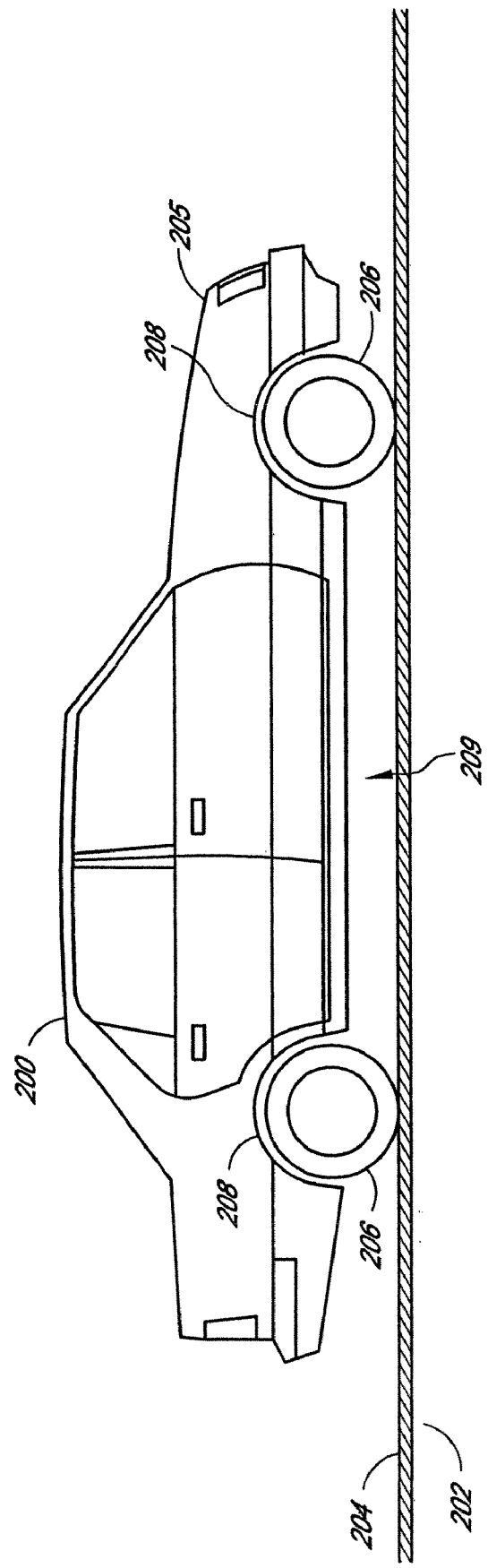
FIG. 4 is schematic view of a vehicle on a roadway.

With reference to FIG. 4, a vehicle 200 is shown on a roadway 202. The roadway 202 is shown with a layer of pollutants 204 disposed on the roadway 202, as is generally known to occur. The vehicle 200 includes a vehicle body 205 and wheels 206, which are shown to be at least partially surrounded by a wheel well 208. The vehicle body 205 includes an underside 209 which is exposed to the roadway 202. As the vehicle 200 moves along the roadway, the pollutants 204 are disturbed by the rotating wheels 206. The pollutants 204 are carried off the roadway 202 due to their contact with the wheels 206 and/or due to the vacuum created under and around the moving vehicle 200. The rotation of the wheels 206 can result in a spray of pollutants that can damage the vehicle and the environment. This situation is exacerbated when it rains. The rain causes the pollutants to rise to the surface of the roadway, creating unsafe driving conditions and increased damage to the environment. Since the wheels 206 are in direct contact with the roadway 202, the pollutant concentration is greatest near the wheels 206 and, in particular, at the wheel well 208 of the vehicle.

The spray of pollutants results from a wind-tunnel effect created by the rotation of the wheels 206. Studies have confirmed that the rotating wheels of a vehicle create low pressure at the wheel, causing objects to be drawn toward the wheel. See, for example, "The Causal Factor of Bus Wheel Injuries and a Remedial Method for Prevention of These Accidents" by James M. Green in Journal of the National Academy of Forensic Engineers, Vol. XVIII, No. 1, dated June 2001.

Figure 5:
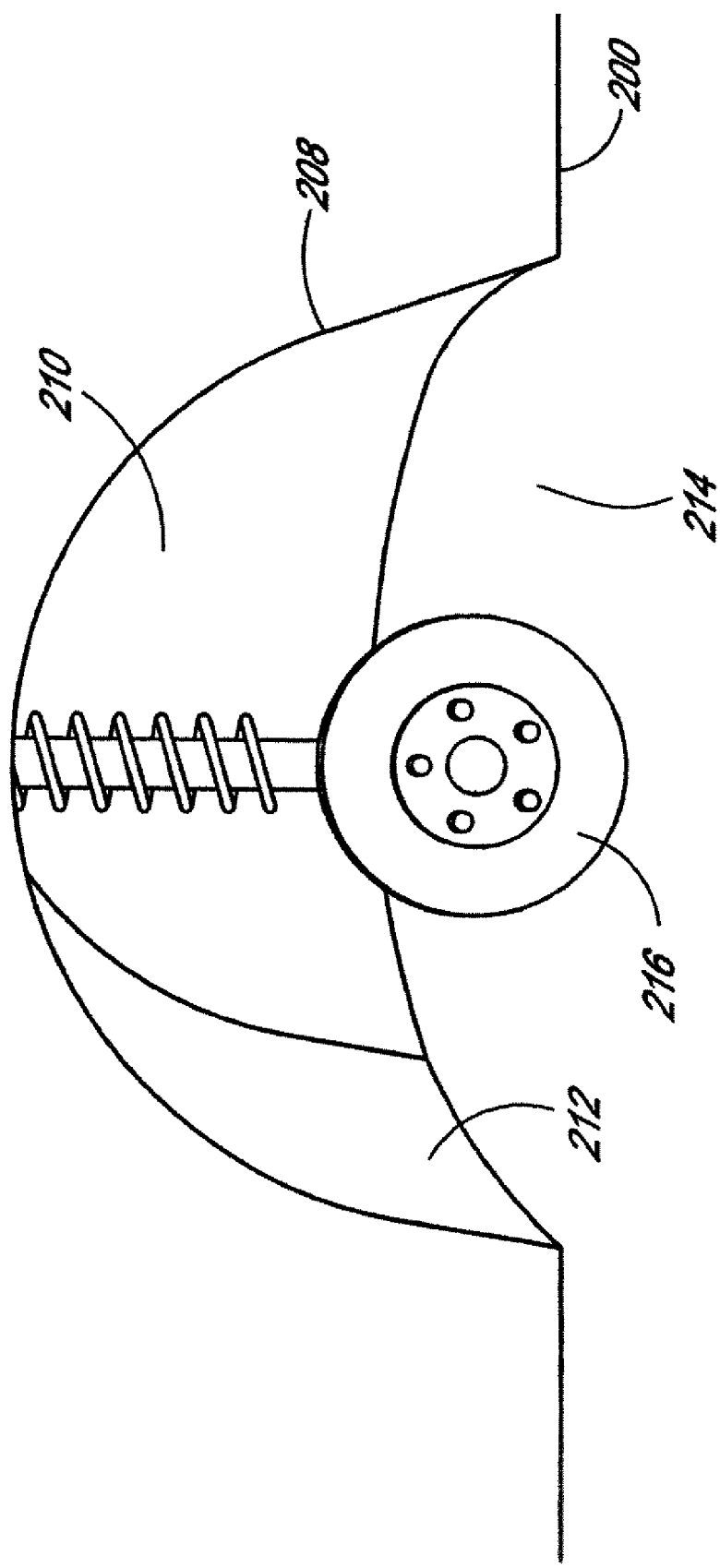
FIG. 5 is a detailed perspective view of the wheel well of a vehicle.

Referring to FIG. 5, a detailed view of the vehicle wheel well 208 is shown where the wheel well 208 does not include a pollutant trap. The wheel well 208 includes an inner surface 210, a transition surface 212, and an opening 214. The transition surface 212 connects the inner surface 210 to the body 205 of the vehicle 200, such that a partially open housing is formed. The wheel well 208 partially houses the wheel 206 and wheel assembly 216.

Figure 6:
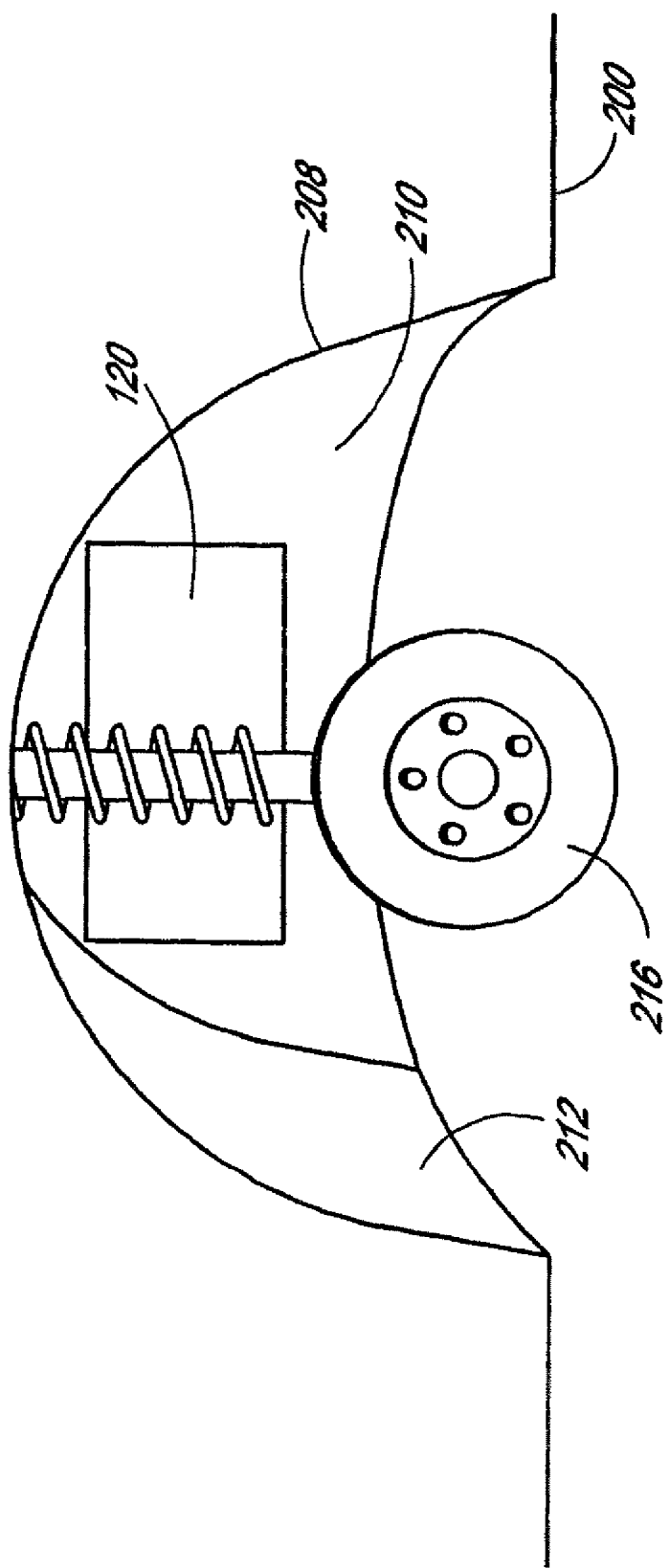
FIG. 6 is a schematic view of the pollutant trap of FIG. 3 used on the wheel well of a vehicle.
Figure 7:
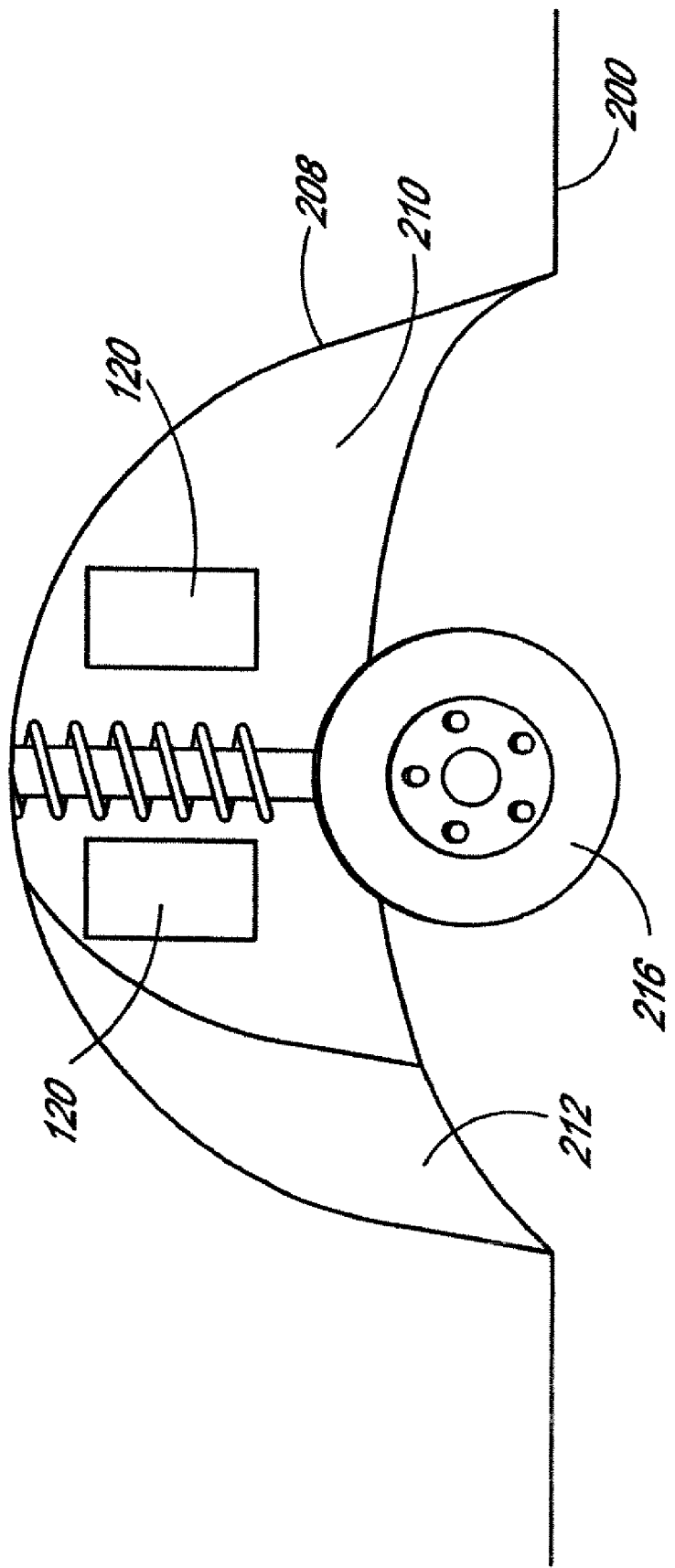
FIG. 7 is a schematic view of the pollutant trap of FIG. 3 used on the wheel well of a vehicle.
Figure 8:
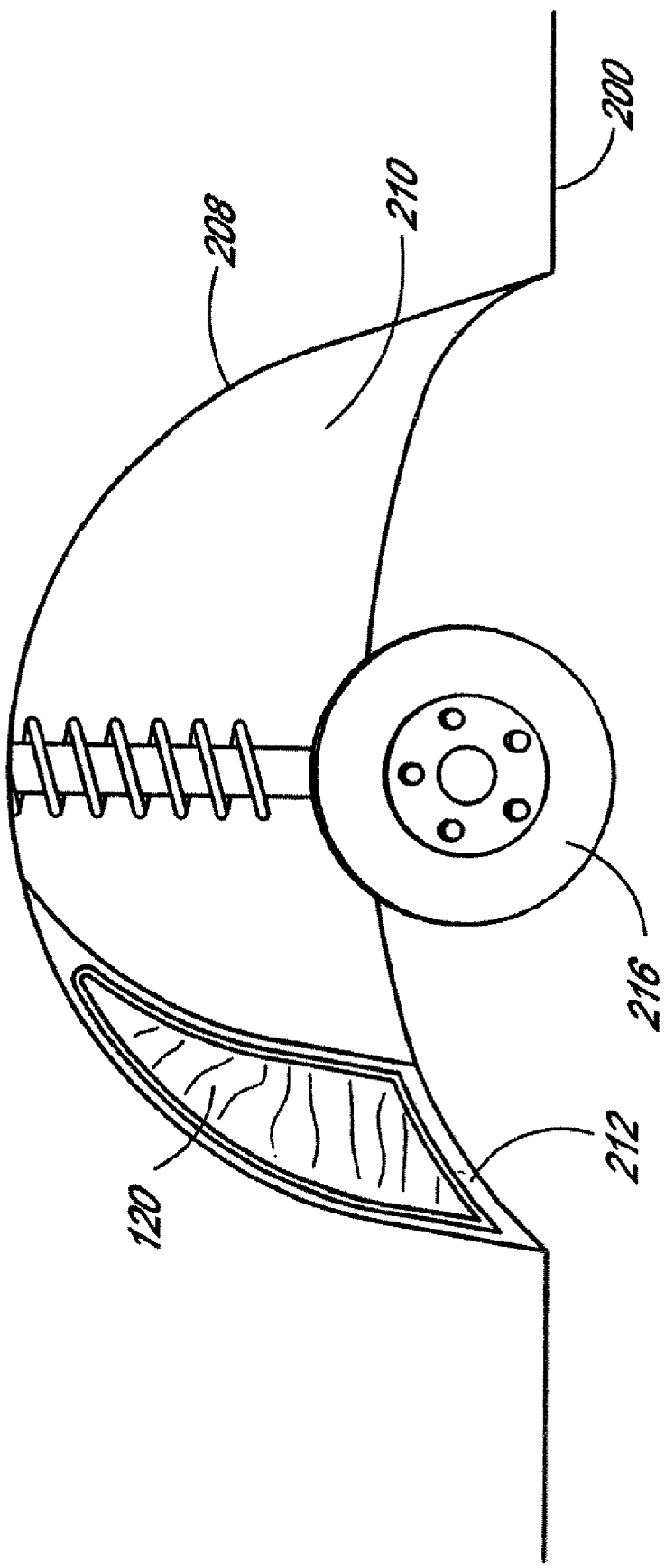
FIG. 8 is a schematic view of the pollutant trap of FIG. 3 used on the wheel well of a vehicle.

With reference to FIGS. 6-8, the pollutant trap(s) 120 is shown attached to the wheel well 208 of a vehicle 200. FIG. 6 shows a pollutant trap 120 attached to the inner surface 210 of the wheel well 208. FIG. 7 shows multiple pollutant traps 120 attached to the inner surface 210 of the wheel well 208. FIG. 8 shows a pollutant trap 120 attached to the transition surface 212 of the wheel well 208. As described hereinabove, since the greatest concentration of roadway pollutants is at the wheel well of a vehicle, it may be desirable to attach the pollutant trap 120 to the wheel well 208. Accordingly, in some embodiments, the wheel well is configured to essentially be the pollutant trap.

The pollutant trap 120 can be made to any suitable configuration, for example, triangular, elliptical, L-shape, square, rectangular, circular, round, spherical, or any other shape that is designed to fit onto any part of a motorized or non-motorized vehicle. The dimensions of the pollutant trap 120 can vary depending on the particular arrangement and location of the pollutant trap 120, as will be described hereinafter. Preferably, the pollutant trap 120 is constructed such that it snugly fits into the wheel well, fender or on a mud flap of a vehicle 200 and has a shape that is commensurate to the wheel well splash pattern of a particular vehicle 100 and/or has a shape and/or position under the vehicle that is optimal for the collection of pollutants driven into and underneath the vehicle 100 by the vacuum created while driving and/or by to the airflow or vacuum created by a pollutant liberator such as a fan, blower, or vacuum apparatus.

The pollutant trap 120 may also include a fastener for attaching the pollutant trap 120 to the vehicle 100. Any method of attachment may be used to attach the pollutant trap 120 to the vehicle 100, such as Velcro, clips, screws, adhesives, fasteners, brackets, and the like.

In one embodiment the pollutant trap 120 is attached to the underside 209 of a vehicle 200. By providing the pollutant trap 120 on the underside of a vehicle 209, the pollutant trap 120 collects the pollutants that are disturbed or liberated when the vehicle 200 is driven on the roadway 202. In another embodiment, still more embodiments, the wheel housing 124 of a vehicle 100 is designed such that it improves the vacuum under the vehicle 100 or into the wheel well and/or focuses the dispersed pollutants onto the pollutant traps pad 126.

Figure 9:
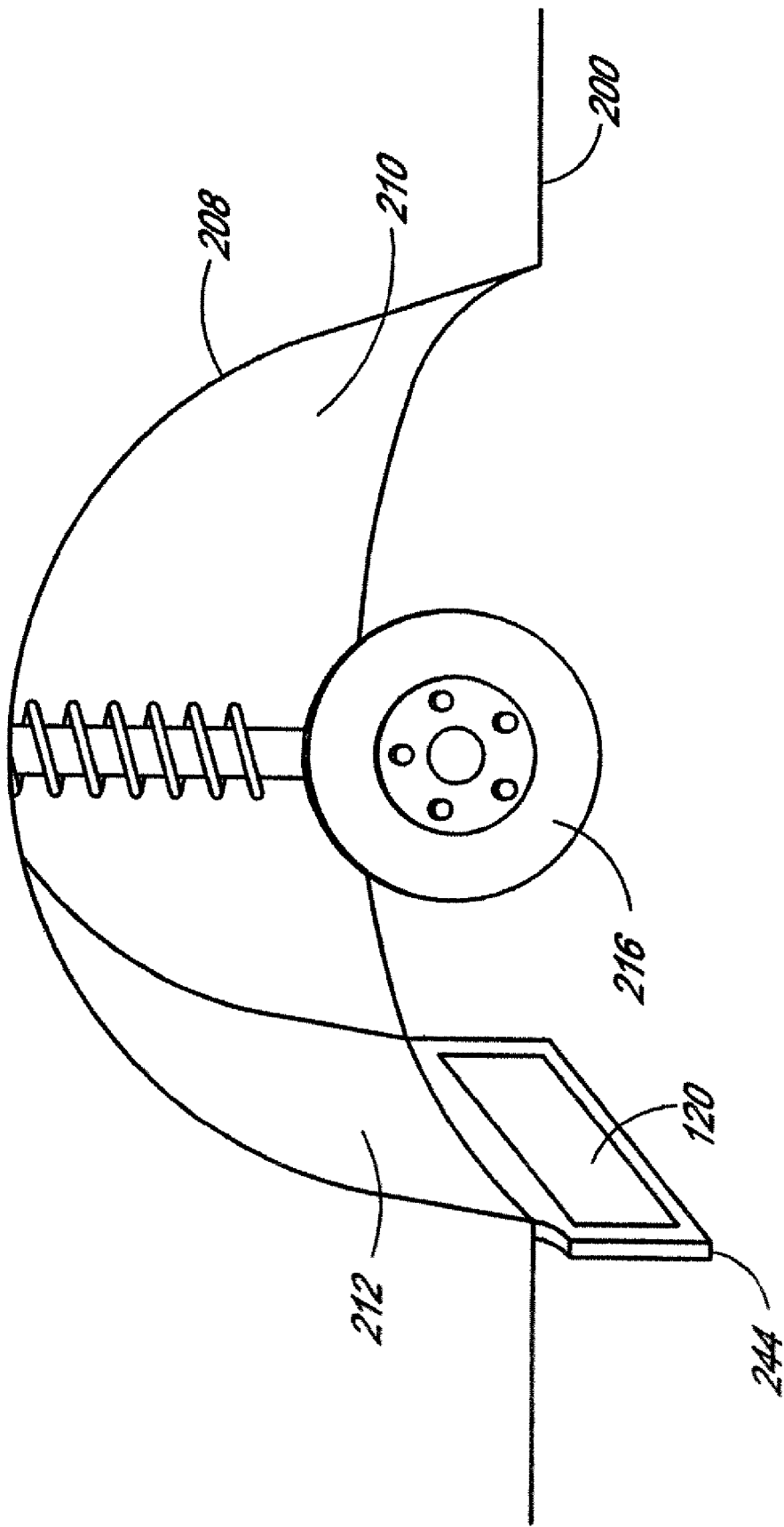
FIG. 9 is a schematic view of the pollutant trap of FIG. 3 used on the mud flap of a vehicle.
Figure 10:
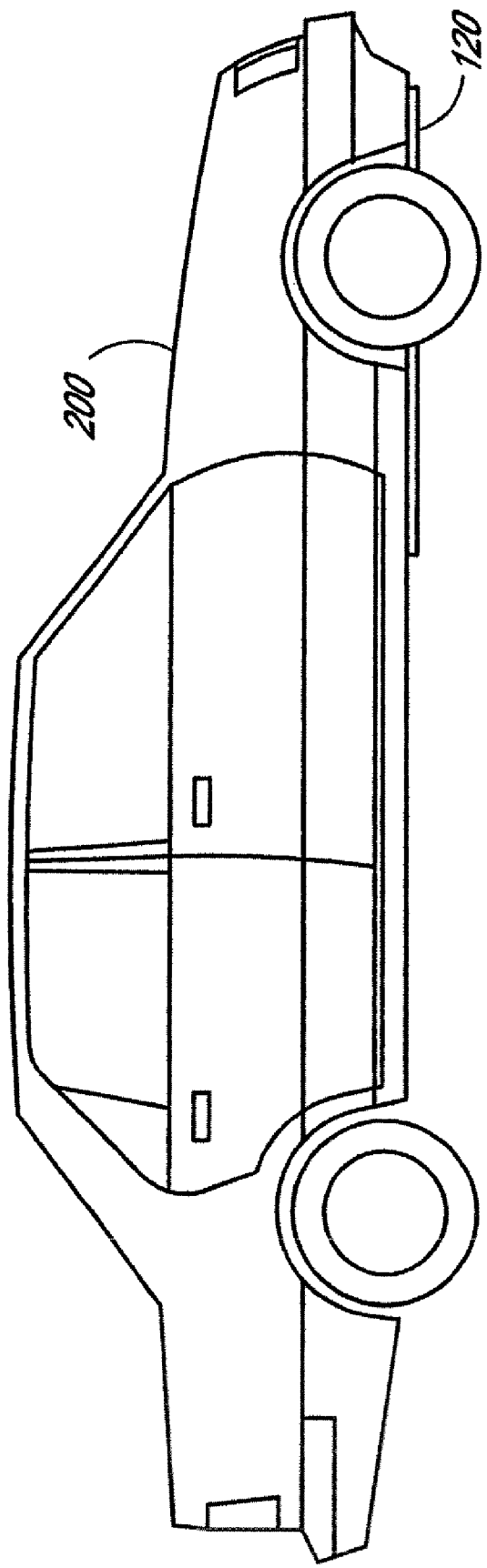
FIG. 10 is a schematic view of the pollutant trap of FIG. 3 used with a vehicle.

As shown FIG. 9, the pollutant trap 120 may also be provided on a mud flap 244 of a vehicle 200. Generally, however, as shown in FIG. 10, the pollutant trap 120 may be provided anywhere on the underside 209 of the vehicle 200, such that the exposed portion of the pollutant trap 120 is facing toward the roadway 202 at a position that collects roadway pollutants as they are liberated from the roadway surface. In some embodiments, the pollutant trap 120 may be provided at the front of the vehicle. In more embodiments, the pollutant trap 120 may be provided at the fender wheel well.

In some embodiments, a pollutant stimulator or liberator (not shown) may be used to increase the air flow near the pollutant trap and/or roadway, thereby increasing the pollutants removed from the roadway and attached to the pollutant trap. In some embodiments, the pollutant stimulator may use forced induction or suction to increase the air flow. Examples of pollutant stimulator include, but are not limited to, blowers, motors, fans and the like.

Figure 11:
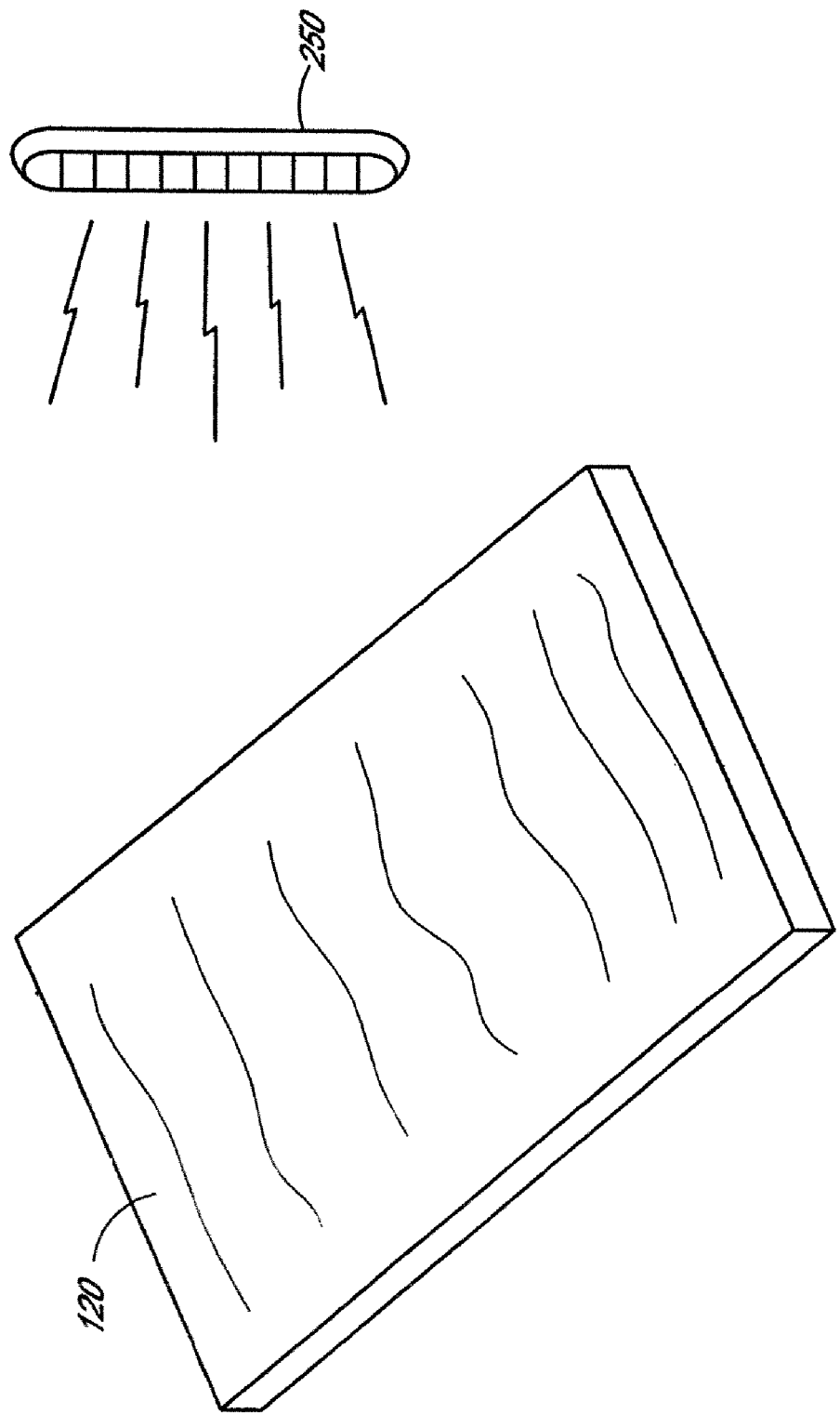
FIG. 11 is a schematic view of the pollutant trap of FIG. 3 exposed to a UV-light source.

In some embodiments, the pollutant trap 120 can be configured to kill bacteria, viruses, and/or other micro-organisms. For example, in one embodiment (not shown) the pollutant trap 120 can include a material that is coated with a liquid which forms a series of microscopic spikes as it dries. The cell membrane of micro-organisms coming into contact with this surface is pierced, resulting in the death of the micro-organism. An example of an anti-microbic liquid which forms said microscopic spikes is Biogreen 3000™, which is available from Microgenix Technologies Limited of Kent, England. FIG. 11 illustrates another embodiment of a pollutant trap 120 that may be used to neutralize micro-organisms. As shown in FIG. 11, the pollutant trap 120 can be exposed to an ultra-violet light source 250 to kill and/or neutralize bacteria, viruses, and other organisms present in the pollutant trap 120. In another embodiment, the pollutant trap 120 includes a disinfectant or an anti-biotic substance or material, for example, an antibiotic substance which is coated on the pollutant trap pad 126. In yet another embodiment, the pollutant trap includes a disinfectant or ozonator that kills microorganisms.

The pollution trap 120 contemplated herein may be configured to be disposed on any suitable vehicle surface. For example, in some embodiments the pollutant trap 120 can be permanently fixed to the vehicle 200. In other embodiments, the pollutant trap 120 can be detachably fixed to the vehicle 200. In some embodiments, the housing 224 can be permanently attached to the vehicle 200. In other embodiments, the pollutant trap pad 126 is detachable and/or replaceable. In still more embodiments, the pollutant trap 120 is exposed, while in other embodiments, the pollutant trap 120 is concealed.

Figure 12:
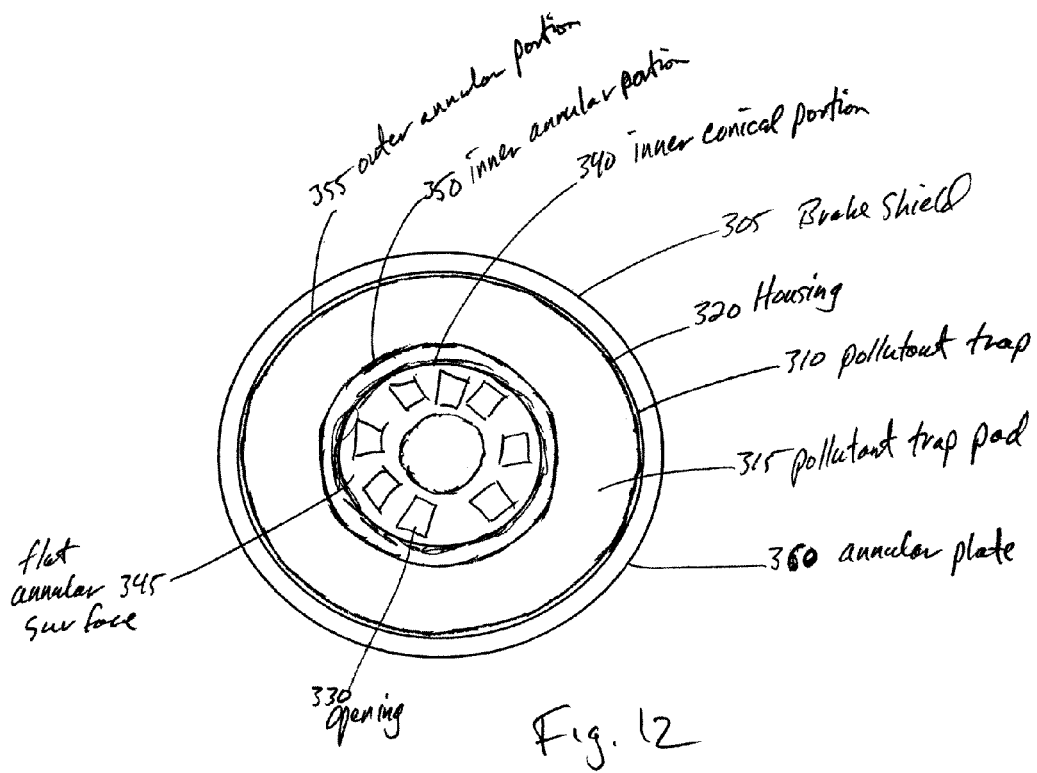
FIG. 12 is a side view of a pollutant trap disposed on brake shield.
Figure 13:
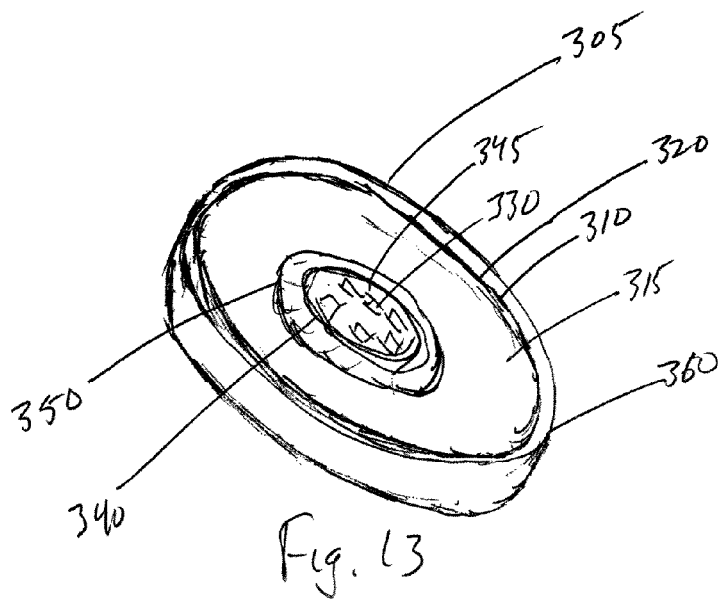
FIG. 13 is a perspective view of a pollutant trap disposed on a brake shield.

Referring now to FIGS. 12-13, in some embodiments, the pollutant trap 310 can be disposed near or on a brake shield 305 to collect pollutants released from a disk brake pad of a vehicle when the disk brake pad engages the disk brake rotor to stop the vehicle. Brake shields are well known in the art, and one such example of a brake shield is described in U.S. Pat. No. 4,484,667, entitled "Shield Plate in Wheel and Disc Brake Assembly" filed Sep. 27, 1982, the entirety of which is incorporated by reference herein. The brake shield 305 can be configured in a variety of ways to suitably fit the numerous types or styles of wheels that are available for automobiles. The example of the brake shield 305 shown in FIGS. 12-13 can be disposed on the inner-side of a wheel of an automobile between a portion of the wheel and a rotor of a disk brake for that wheel. The brake shield 305 can be configured to have a thin annular plate 360 and include an inner conical portion 350. A flat annular surface 345 containing openings 330 for passing the wheel studs can be connected to the inner conical portion 350 of the brake shield 305.

FIGS. 12-13 also illustrate an embodiment of a pollutant trap 310 that can be affixed near the brake shield 305 to capture brake dust generated from the disk brake pad. The pollutant trap 310 can be disposed on or next to an inner-facing surface of the brake shield 305, e.g., the surface that faces the rotor of a disk brake. The pollutant trap 310 can have an annular donut shape with an inner annular portion 340 that fits around the inner conical portion 350 of the brake shield 305 and an outer annular portion 355 that fits inside of the annular plate 360. In some embodiments the pollutant trap 310 can extend to the edge of the annular plate 360. The pollutant trap 310 includes a pollutant trap pad 315 to collect the brake dust and other pollutants. The pollutant trap pad 315 can be removable from the pollutant trap 310 for disposal and replacement. In some embodiments, the pollutant trap 310 shown in FIGS. 12-13 and described above can be integrated with the brake shield 305 such that they are a single unit (e.g., the pollutant trap 310 performs the function of the brake shield and the pollutant trap) to block brake dust from the wheel and capture the brake dust and other pollutants on the pollutant trap pad 315.

Figure 14:
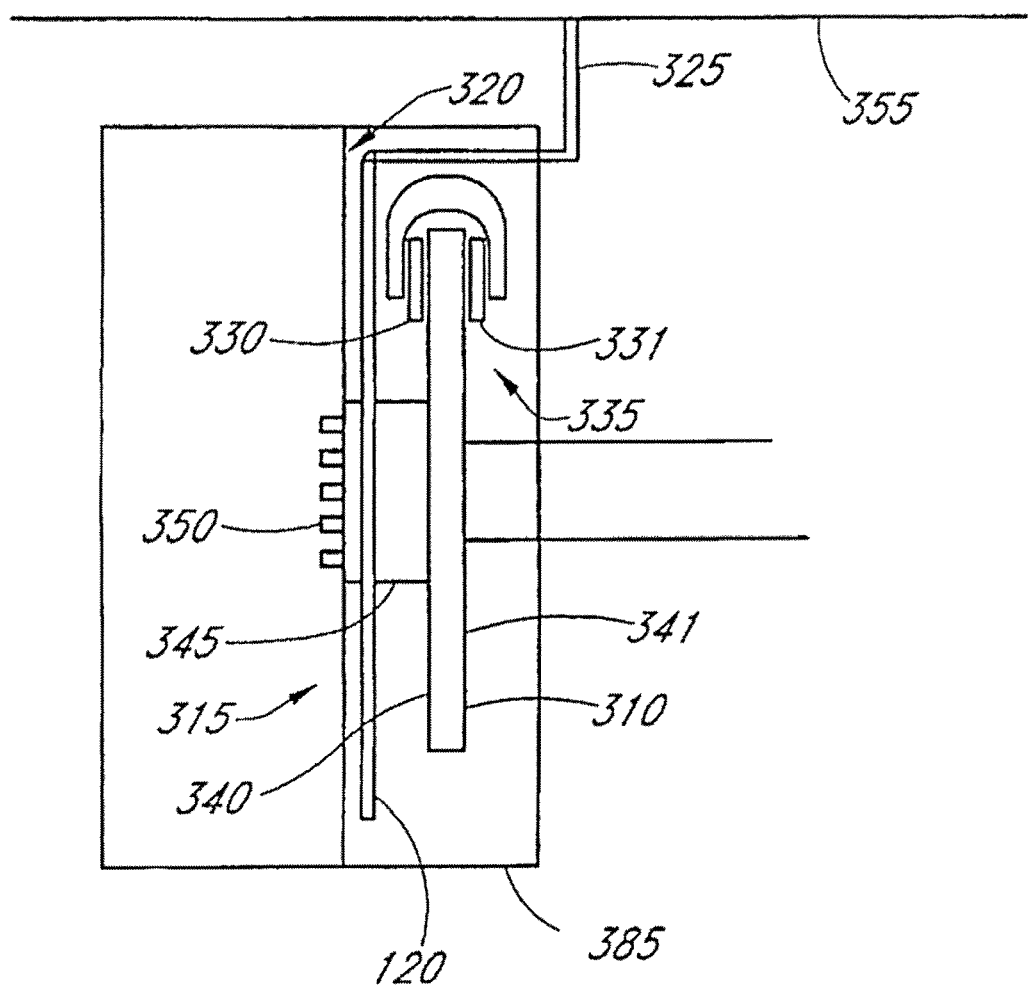
FIG. 14 is a front view of a pollutant trap disposed between a portion of a rim and a portion of a braking surface.

Referring now to FIG. 14, in some embodiments the pollution trap 120 can be disposed near a brake assembly 335. The brake assembly 335 can include a movable braking surface 340, for example, as typically found on a brake rotor 310, and one or more brake pads 330. In this example, the brake assembly 335 includes a brake rotor 310 with two braking surfaces 340, 341 and two disc brake pads 330, 331. The pollution trap 120 can also be used to capture pollutants from other embodiments of brake assemblies, for example, a typical drum brake assembly (not shown) that includes drum brake shoes and a brake drum with a braking surface. In some embodiments, the brake assembly can have one braking surface or two or more braking surfaces, and can also have one brake pad or two or more brake pads. The pollution trap 120 can be positioned such that it is exposed to a pollutant so that it can capture at least a portion of the pollutant for example, brake dust, generated from placing the brake pad 330 in contact with the braking surface 340 while the braking surface 340 is in motion. The pollutant generated can include, for example, particles from the brake pad 330 or from the braking surface 340 that are freed as a result of friction between brake pad 330 and the braking surface 340 during braking.

Figure 15:
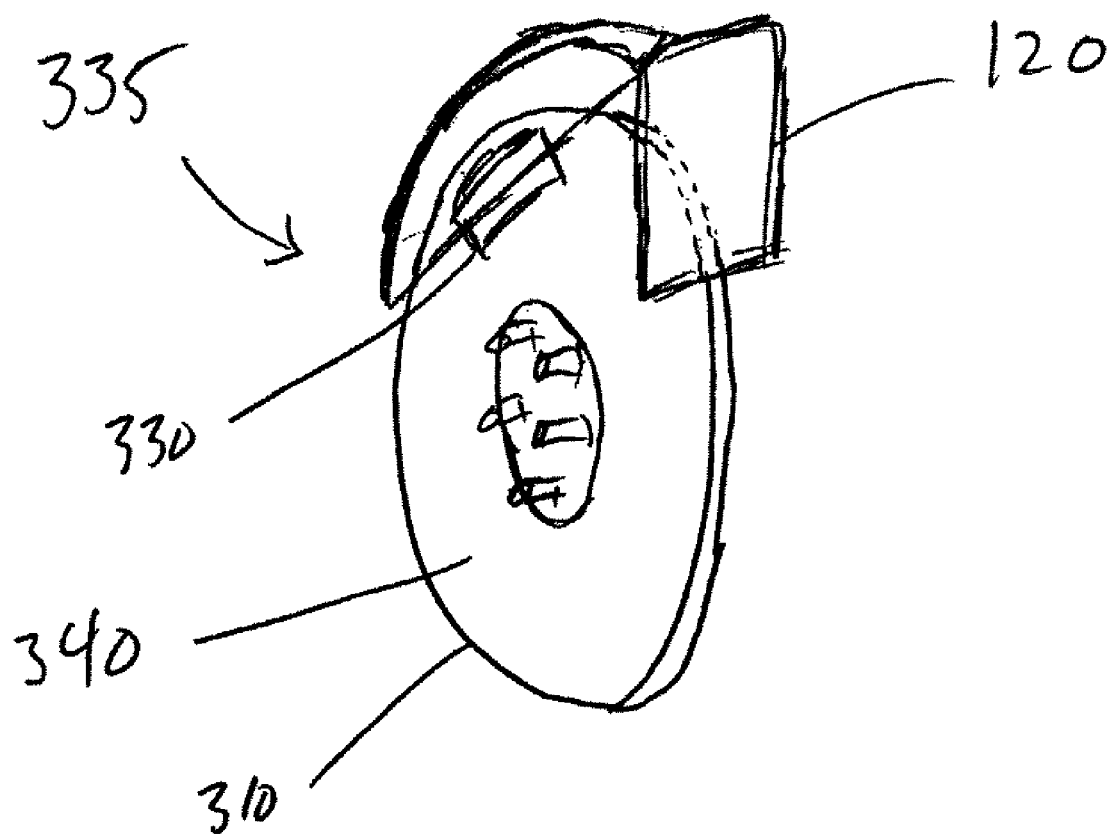
FIG. 15 is a perspective view of a pollutant trap disposed on a brake assembly.

Referring to FIG. 15, in some embodiments for positioning the pollution trap 120 near the brake assembly 335, the pollution trap 120 can be connected to the brake assembly 335 using a fastener, such as a bolt, to hold the pollution trap 120 in a suitable position to collect pollutants. In other embodiments, the pollution trap 120 can be connected to the vehicle, connected to a member that is connected to the vehicle, connected to the wheel, or connected to a structure on the underside of the vehicle or the underside of the vehicle itself. Determining the optimal place for connecting the pollution trap 120 to the vehicle can be at least partially dependent on the configuration of the vehicle itself. The embodiments disclosed herein are examples of places to connect the pollution trap to the vehicle, but these examples are not meant to limit the disclosure to only those places specifically disclosed.

In some embodiments, the pollutant trap 120 is positioned proximal to the brake assembly 335, e.g., in close enough relation such that collection of brake dust by the pollution trap 120 is possible. Embodiments are contemplated where the pollution trap 120 can be positioned at a variety of locations relative to the brake assembly 335. For example, the pollution trap 120 can be positioned proximal to the braking point of contact, for example, the point of contact of the brake pad, e.g., brake pad 330, and a braking surface, e.g., the braking surface 340, and in any direction relative to the braking point of contact, such that the pollution trap pad can collect at least some of the brake dust generated from braking. For example, the pollutant trap 120 can be positioned at or about the following distances from the braking point of contact, e.g., less than 5 millimeters, equal to or between (in millimeters) 5-10, 10-15, 15-20, 20-25, 25-30, 30-35, 35-40, 40-45, 45-50, 50-55, 55-60, 60-65, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240, 240-245, 245-250, 250-255, 255-260, 260-265, 265-270, 270-275, 275-280, 280-285, 285-290, 290-295, 295-300, 300-305, 305-310, 310-315, 315-320, 320-325, 325-330, 330-335, 335-340, 340-345, 345-350, 350-355, 355-360, 360-365, 365-370, 370-375, 375-380, 380-385, 385-390, 390-395, 395-400, 400-405, 405-410, 410-415, 415-420, 420-425, 425-430, 430-435, 435-440, 440-445, 445-450, 450-455, 455-460, 460-465, 465-470, 470-475, 475-480, 480-485, 485-490, 490-495, 495-500, 500-505, 505-510, 510-515, 515-520, 520-525, 525-530, 530-535, 535-540, 540-545, 545-550, 550-555, 555-560, 560-565, 565-570, 570-575, 575-580, 580-585, 585-590, 590-595, 595-600, 600-605, 605-610, 610-615, 615-620, 620-625, 625-630, 630-635, 635-640, 640-645, 645-650, 650-655, 655-660, 660-665, 665-670, 670-675, 675-680, 680-685, 685-690, 690-695, 695-700, 700-705, 705-710, 710-715, 715-720, 720-725, 725-

730, 730-735, 735-740, 740-745, 745-750, 750-755, 755-760, 760-765, 765-770, 770-775, 775-780, 780-785, 785-790, 790-795, 795-800, 800-805, 805-810, 810-815, 815-820, 820-825, 825-830, 830-835, 835-840, 840-845, 845-850, 850-855, 855-860, 860-865, 865-870, 870-875, 875-880, 880-885, 885-890, 890-895, 895-900, 900-905, 905-910, 910-915, 915-920, 920-925, 925-930, 930-935, 935-940, 940-945, 945-950, 950-955, 955-960, 960-965, 965-970, 970-975, 975-980, 980-985, 985-990, 990-995, and 995-1000 millimeters, and greater than 1000 millimeters.

Referring again to FIG. 14, in some embodiments, a rim or wheel 385 is connected to the brake surface 340, via a member 345 and held in place using wheel studs 350, and the rim 385 rotates when the brake surface 340 rotates and slows when the brake pad 330 is placed in contact with the braking surface 340. This embodiment can be suitable for use on a vehicle with any number of wheels that use brakes that generate pollutants while braking the vehicle. The rim 385 can have an inner portion 320 generally facing towards at least a portion of the braking surface 340 and an outer portion 315 generally facing away from the braking surface 340. The pollutant trap 120 can be positioned between the inner portion 320 of the rim 385 and at least a portion of the braking surface 340 such that the pollution trap is exposed to pollutants (e.g., brake dust) and also shield the rim 385 from pollutants. In some embodiments the pollution trap 120 is not connected to the rim 385. In other embodiments, the pollution trap 120 can be connected to the rim 385. For example, in some embodiments, the pollution trap 120 can be configured to snap onto the rim (not shown).

In one embodiment, the pollution trap 120 can be connected to portion of a member 325 which holds the pollutant trap 120 near the brake assembly 335 such that the pollution trap 120 is exposed to pollutants but neither the member 325 or the pollution trap 120 interfere with the movement of the rim 385, the braking surface 340, or the operation of the brake assembly. In some embodiments where the pollution trap 120 is connected to the member 325, the pollution trap can remain generally stationary, for example, it does not rotate with the rotation of the brake surface 340 or the rim 385. A portion of the member 325 can also be connected to an object near the rim 385, for example, a surface or structure of a vehicle, for example, the surface of vehicle wheel well 355. In the embodiments for a pollution trap 120 described herein, the pollution trap 120 can be configured to contain multiple pollution trap pads such that the removal of a first pollution trap pad exposes a second pollution trap pad to a pollutant generated from braking.

Embodiments of a pollution trap and the methods of reducing pollutants on the roadway surface, as generally described herein, are not limited to four-wheeled vehicles, and are not limited to motorized vehicles. Pollution traps can be suitably designed for use on numerous types of vehicles, including two wheeled vehicles (e.g., motorcycles, bicycles, scooters, mopeds, Human Segway Transporters), three wheeled vehicles (e.g., motorized tricycles and ATV's, and non-motorized tricycles), four wheeled vehicles (e.g., ATV's, tractors, cars, trucks, vans, etc.), and other larger vehicles with more than four wheels (e.g., multi-wheeled trucks, etc.). A vehicle can be configured to include one or more pollution traps. The pollution traps can be disposed anywhere on the vehicles where the pollutant trap pad 126 can be exposed to roadway pollutants. For example, the pollution trap can be positioned in numerous places on a vehicle including, but is not limited to, fenders, front spoilers, rear spoilers, splash guards, mud flaps, wheel wells, the underside of the vehicle, or any other suitable location on the vehicle where the pollutant trap can be exposed to roadway pollutants. Additionally, pollutant traps can be placed in on any type of vehicle in locations where the pollutant trap pad 126 is not normally exposed to roadway pollutants but becomes exposed to the roadway pollutants through the use of a fan or a blower, a vacuum, or any air flow through and around the vehicle, designed or naturally occurring, or any type of device that carries the roadway pollutants to the pollutant trap pad 126.

A pollutant trap can be designed in numerous ways. In one embodiment, the pollutant trap 120 can include a single pollutant trap pad 126. In another other embodiment (not shown), the pollutant trap 120 can include multiple pollutant trap pads disposed on a roll, where one pollutant trap pad is exposed to the roadway and, after a period of time, the exposed pollutant trap pad is removed from the roll thereby exposing another pollutant trap pad which can be used to collect roadway pollutants.

In another embodiment (not shown), the pollution trap 120 can include multiple pollutant trap pads generally configured in a stack, similar to, for example, a tissue box or a napkin dispenser, with one pollutant trap pad 126 exposed to the roadway pollutants. After a period of time, the exposed pollutant trap pad 126 is removed from the pollutant trap 120 thereby exposing to the environment another pollutant trap pad 126, which is then used to collect roadway pollutants.

In yet another embodiment, the pollution trap 120 can include an indicator that shows when the pollutant trap 120 or the pollutant trap pad 126 should be serviced, for example, when the pollution trap 120 should be changed or when the pollutant trap pad 126 should be changed. In embodiments that use multiple pollutant trap pads 126, (e.g., a roll of pollutant trap pads 126 or a stack of pollutant trap pads 126), the pollutant trap 120 can include an indicator that shows when to remove the exposed pollutant trap pad 126 so that another pollutant trap pad 126 can be exposed to the environment. The aforementioned indicator can be incorporated in various ways. For example, in one embodiment the indicator is disposed on the pollutant trap frame. In another embodiment, the indicator is a chemical on the pollutant trap pad that visibly changes color to indicate when the pollutant trap pad 126 should be changed. In another embodiment, the indicator is a sensor or a sensing system that can be separate from the pollutant trap 126 or the pollutant trap and provides a signal that indicates when the pollutant trap 120 or the pollutant trap pad 126 should be serviced or changed. While the numerous materials disclosed herein are examples of suitable materials that can be used in a pollutant trap, the disclosure is not limited to said disclosed materials.

In another embodiment, the same material used to form a pollution trap pad can also be used in the manufacture of gloves, wipes, sponges and cloths that are used for collecting brake dust. Preferably, the material can have brake dust adherence properties. In some embodiments the material can have hydrocarbon binding properties. For example, the material can be formed into a glove which covers at least a portion of the hand. The gloves, wipes, cloths and sponges can be used by, for example, detailers, dealers and consumers, to remove accumulated brake dust and then be disposed of properly. The brake dust adherence properties of the gloves, wipes, cloths and sponges made from the material that is used to form a pollution trap pad allows the dust to be collected and disposed of in an environmentally safe manner. Various sizes and shapes of gloves, cloths, wipes and sponges are contemplated for removing brake dust. For example, the wipes, cloths and sponges may be configured as sheets, e.g., substantially flat and thin with generally parallel sides. In some embodiments, the wipes and sponges may also comprise a cleaning solution that helps to separate the brake dust from the wheel or brake part it has collected on. In some embodiments, the wipes are formed into a stack and dispensed to a user one at a time, where removing one wipe allows access to the underlying wipe.

The pollutant trap collects pollutants that are exposed to the pollution trap pad by, for example, the air flow in and around a wheel well, or the disbursal of the pollutants from a polluting device, e.g., brake dust from the brake assembly. Vehicles and devices on vehicles may not be currently designed to focus air flow to a pollution trap positioned on a vehicle, for example, in the wheel well. Certain design considerations of a vehicle and devices included on the vehicle can enhance the ability of the pollutant trap to collect pollutants by enhancing or focusing the flow of air to the pollutant trap or by directing the flow of pollutants to the pollutant trap. For example, the wheel wells, wheels, brake assemblies, brake shields, and/or mud flaps can all be designed to enhance the effectiveness of the collection of pollutants on the pollution trap. Also, in certain applications, one design of a pollution trap may work better than another pollution trap design. For example in certain applications, a pollution trap may work better with either a flow-through filter or a solid filter or membrane. In other applications, the effectiveness of the pollutant trap can be increased by including include louvers, fans or other systems or devices that increase the amount of pollutants exposed to the pollution trap pad. One or more of the components that may affect the flow of air or the disbursement of pollutants can be designed to increase the amount of the pollutants the pollution trap collects through testing each various device design and measuring the amount of pollutants that are collected with each design. For some applications, the coordinated design of several components (e.g., wheel wells and brake assemblies) can increase the effectiveness of the pollutant trap.

By one approach, for example, a first design of a pollutant trap comprising a pollution trap pad is mounted in the wheel well of an automobile and the automobile is placed on a testing apparatus that allows for the wheel of the vehicle to be suspended (e.g, a auto-lift, as commonly used in the automotive industry). The automobile is turned on, the transmission is engaged, the wheels are induced to revolve at a specific speed or revolution/minute, and the airflow to the pad is monitored by a conventional airflow detector (e.g., colored smoke or a chemical aerosol is blown into the wheel and amount of smoke or chemical directed to the pad is monitored by video, time-lapse photography, or a smoke or chemical detector placed on the pad itself). Preferably, the airflow to the pad is monitored at several speeds or revolutions/minute of the wheels and optionally, the brakes can be applied so as to generate brake dust and the spray pattern of brake dust given the speed or revolutions/minute of the wheel and particular design is monitored. Once the data for the first design of wheel well comprising a first design of pollutant trap such as airflow to the pad, amount of aerosol pollutant or brake dust collected on the pad has been obtained and, preferably, recorded, a second design of pollutant trap and/or a second design of wheel well is tested in the same manner. The second design wheel well can differ from the first by having louvers or air flow modulators or air flow directors that enhance or direct the airflow generated by the revolution of the wheel (e.g., natural airflow generated by movement of the tire) or enhance or direct the airflow generated by a fan or blower (e.g., artificially-induced airflow) to the pad, for example. Similarly, the second design of a pollutant trap comprising the pollution trap pad can differ from the first by having a shape or attribute that enhances or directs the airflow or pollutants to the pad, such as louvers or air flow modulators or air flow directors. Again, the data is collected, preferably recorded, and is compared to the data for the first design. Through the comparison of data, design features that facilitate airflow and/or pollutant collection at the pad are identified and a basis for a third design of wheel well and/or pollutant trap is determined. The process steps of designing a wheel well feature that facilitates airflow or pollutant capture at the pad, separately or in conjunction with the design of a pollutant trap and/or pad feature, analyzing the airflow behavior at or near the wheel well, brake assembly, or pollutant trap pad and selecting a new design of wheel well or feature thereof or pollutant trap, pollutant trap pad, or feature thereof is also an embodiment of the disclosure. Accordingly, some embodiments encompass methods of identifying a design of a wheel well and/or a pollutant trap assembly comprising a pollution trap pad, whereby a first design of wheel well is selected, a first design of pollutant trap is selected, and the direction, amount, or force of airflow to the pollution trap pad or the amount of pollution collected on the pad is monitored or is compared to the direction, amount, or force of airflow to the pollution trap pad or the amount of pollution collected on the pad of a second design of a wheel well and/or a pollutant trap assembly comprising a pollution trap pad such that a difference in the direction, amount, or force of airflow to the pollution trap pad or the amount of pollution collected on the pads of the two wheel well and/or pollution trap pad designs are observed. By following these methods, more efficient pollution traps and/or wheel well assemblies are developed.

The following examples describes experiments conducted using prototype pollutant trap 120 to verify that the prototype pollutant trap reduced the amount of hydrocarbons on the roadway surface.

EXAMPLE 2

A pollutant trap 120 was affixed to the wheel well of a truck, and the vehicle was driven in Hawaii under wet roadway conditions. After driving about 150 miles, the pollution trap 120 was removed and analyzed for the presence of hydrocarbons. The Food Quality Lab of Honolulu, Hi. was employed to independently analyze the amount of petroleum hydrocarbons that had accumulated on the pollution trap.

The data showed that a significant amount of petroleum hydrocarbons had accumulated on the pollution trap during the brief testing period. These results verified that the pollutant trap 120 significantly reduced the amount of roadway pollutants on a wet roadway surface. The following example describes a test that can be performed to verify that the pollutant trap 120 can remove roadway pollutants under dry road conditions, as well.

EXAMPLE 3

A pollutant trap 120 is applied to the wheel well of a truck, and driven in Hawaii under dry roadway conditions. After driving about 150 miles, the pollution trap 120 is removed and analyzed for the presence of hydrocarbons. The Food Quality Lab of Honolulu, Hi. can be employed to analyze the accumulation of roadway pollutants on the pollution trap. It will be determined that the pollution trap also significantly reduces the amount of roadway pollutants on dry roadway surfaces. The following example describes another test that verified that the pollutant trap 120 effectively removes roadway pollutants.

EXAMPLE 4

A pollutant trap 120 was affixed to the wheel well of a 2002 Chevrolet Avalanche and the vehicle was driven around the urban areas of Honolulu, Hi. under mixed road conditions (i.e., both wet and dry conditions). After driving about 1500 miles, the pollution trap 120 was removed and was analyzed for the presence of hydrocarbons and heavy metals. An independent laboratory, Advanced Analytical Lab, LLC of Honolulu, Hi. was employed to analyze the accumulation of roadway pollutants on the pollutant trap 120.

The results showed that a significant amount of total petroleum hydrocarbons had accumulated on the pollutant trap 120 during the brief testing period. Additionally, the results showed that a significant amount of heavy metals including barium, chromium, copper, lead, and selenium were also collected onto the pollutant trap 120. These results verified that a system comprising a vehicle and a pollutant trap 120, as described herein, effectively removes hydrocarbons and heavy metals from a roadway surface. The next example provides more proof that embodiments of the disclosure described herein effectively remove pollutants from the environment.

EXAMPLE 5

Different pollutant traps 120 were affixed to the wheel wells of a Nissan Frontier/King cab pick-up truck that was driven around the urban areas of Las Vegas, Nev. under mixed road conditions (i.e., wet or dry conditions). After driving approximately 402 miles, 681 miles, 1415 miles, or 3278 miles, the pollutant traps 120 were removed and were analyzed for the presence of hydrocarbons, heavy metals, and various chemicals. An independent laboratory, NEL Laboratories of Las Vegas, Nev. was employed to analyze the accumulation of roadway pollutants on the pollutant traps 120.

In a first set of experiments, the same type of pollutant trap 120 was tested under dry and wet road conditions. The results showed that a significant amount of total petroleum hydrocarbons (TPH) had accumulated on the pollutant trap 120 in both wet and dry conditions. For example, a 2.5 inch×2.5 inch square cut from the filter accumulated approx. 6.5 mg total TPH under dry conditions (approx. 0.04 fl. oz of total TPH/sq. inch) and 17.2 mg TPH (approx. 0.11 fl. oz of total TPH/sq. inch) under wet conditions. Appreciable amounts of heavy metals including barium, cadmium, chromium, and lead were also collected onto the pollutant traps 120 and volatile chemicals such as dibromofluoromethane, toluene, and 4-bromofluorobenzene had also accumulated on the pollutant traps 120. These experiments verified that the pollutant trap 120 effectively removed hydrocarbons, heavy metals, and volatile chemicals from the environment under wet or dry road conditions.

In a second set of experiments, the ability of different pollutant traps to accumulate hydrocarbons, heavy metals, and chemicals were compared under dry road conditions. Both types of pollutant traps 120 were found to be effective at removing total hydrocarbons, heavy metals, and chemicals from the environment. In fact, the amount of hydrocarbons accumulated on one type of pollutant trap 120 was more than 4 times the amount of hydrocarbons than was found present on the control (unexposed) section of pollutant trap 120. The results showed that barium, cadmium, chromium, copper, lead, silver, mercury (on one type of filter), 4-bromofluorobenzene, dibromofluoromethane, and toluene had accumulated. These results provide more evidence that a system comprising a vehicle and a pollutant trap 120, as described herein, effectively removes hydrocarbons, heavy metals, and chemicals from the environment. Roadway tests as provided in the examples above are to be conducted in all 50 states of the United States and various countries throughout the world, as described in the following example.

EXAMPLE 6

Pollution traps 120 are applied to the wheel wells of several vehicles, and driven in all 50 states under wet and dry conditions and in several foreign countries. After driving about 1000 miles, the pollution traps 120 are removed and analyzed for the presence of roadway pollutants by, for example, The Food Quality Lab of Honolulu, Hi. These experiments will show that the amount of roadway pollutants, such as hydrocarbons and toxic metals, can be reduced in all 50 states and in several countries throughout the world by employing the pollution trap 120 described herein.

EXAMPLE 7

A pollution trap 120 was applied to the wheel wells of a vehicle and driven in all Nevada under wet and dry conditions. After driving about 3000 miles, the pollution trap 120 was removed and analyzed for the presence of roadway pollutants by, EMSL Analytical, Inc ("EMSL") of Westmont, N.J. EMSL used a combination of polarized light microscopy, scanning electron microscopy, transmission electron microscopy, energy dispersive X-ray spectrometry, and X-ray diffraction to analyze the particles deposited on the pollutant trap. EMSL identified the following concentration (percentages) of particles: quartz 23%, calcite 20%, dolomite 17%, other minerals 2%, calcium silicate 25%, steel fragments 2% and unidentified organics 11%. EMSL also identified the following information related to particle size distribution on the exposed pollutant trap pad:

TABLE 1

Particle Size Distribution

| Particle Size Range (μm) | Exposed Material % by Particle Area | Exposed Material % by Number of Particles |
| --- | --- | --- |
| 01.78-0.316 | .9 | 31.8 |
| 0.316-0.562 | 3.2 | 37.5 |
| 0.562-1 | 5.2 | 18.1 |
| 1-1.78 | 6.5 | 6.9 |
| 1.78-3.16 | 9.8 | 3.4 |
| 3.16-5.62 | 13.1 | 1.4 |
| 5.62-10 | 19.3 | 0.6 |
| 10-17.8 | 16.8 | 0.2 |
| 17.8-31.6 | 25.1 | 0.1 |
| 31.6-100 | None Detected | None Detected |

This experiment showed that a pollutant trap 120 can remove roadway pollutant particles of various compositions under a variety of conditions and thereby reduce the amount of roadway pollutants.

The foregoing description details certain embodiments of the disclosure. It will be appreciated, however, that no matter how detailed the foregoing appears in text, the disclosure can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated. The scope of the disclosure should therefore be construed in accordance with the appended claims and any equivalents thereof. All of the references cited herein are expressly incorporated by reference in their entireties.

The invention claimed is:

1. A pollution trap comprising:
   A wheel rim with an inner portion facing towards a braking surface;
   a pollution trap connection means along the circular inner portion of said wheel rim; and
   a length of pollution trap material connected to the circular inner portion of said wheel rim facing the brake assembly such that the pollutant trap which is remote from the brake assembly is exposed to pollutants generated from contacting the brake pad and the brake surface.

2. The pollution trap of claim 1 wherein the connection means is hook and loop.

3. The pollution trap of claim 1 wherein the connection means is adhesive.

4. The pollution trap of claim 1 wherein the connection means is one or more clips.

5. The pollution trap of claim 1 wherein the pollution trap material is a layered pad.

6. The pollution trap of claim 1 wherein the pollution trap material is a layered pad.

7. A pollution trap comprising:
   a wheel rim with an inner portion facing towards a braking surface;
   a pollution trap connection means along the circular inner portion of said wheel rim generally perpendicular to the brake rotor; and
   a length of pollution trap material connected to the circular inner portion of the said wheel rim positioned facing the brake assembly such that the pollutant trap which is remote from the brake assembly is exposed to pollutants generated from contacting the brake pad and the brake surface.

8. The pollution trap of claim 7 wherein the connection means is hook and loop.

9. The pollution trap of claim 7 wherein the connection means is adhesive.

10. The pollution trap of claim 7 wherein the connection means is one or more clips.

11. The pollution trap of claim 7 wherein the pollution trap material is a layered pad.

* * * * *